United States Patent
Akabane et al.

(10) Patent No.: US 7,871,207 B2
(45) Date of Patent: Jan. 18, 2011

(54) LENS DRIVE DEVICE

(75) Inventors: Makoto Akabane, Nagano (JP); Akira Mori, Nagano (JP)

(73) Assignee: Nidec Sankyo Corporation (JP)

( * ) Notice: Subject to any disclaimer, the term of this patent is extended or adjusted under 35 U.S.C. 154(b) by 0 days.

(21) Appl. No.: 12/554,348

(22) Filed: Sep. 4, 2009

(65) Prior Publication Data

US 2010/0061712 A1 Mar. 11, 2010

(30) Foreign Application Priority Data

Sep. 5, 2008 (JP) ............................ 2008-228802

(51) Int. Cl.
*G03B 3/10* (2006.01)
*G03B 17/00* (2006.01)
(52) U.S. Cl. ...................... 396/439; 396/133
(58) Field of Classification Search ............. 396/133, 396/439
See application file for complete search history.

(56) References Cited

U.S. PATENT DOCUMENTS 7,768,726 B2 * 8/2010 Kawamoto ............... 359/823

| 2004/0207745 A1* | 10/2004 | Tsuruta et al. | ............. 348/335 |
|---|---|---|---|
| 2005/0276172 A1* | 12/2005 | Tsutsumi | ............. 369/44.14 |
| 2007/0092238 A1* | 4/2007 | Shirakata | ............. 396/72 |
| 2007/0116445 A1* | 5/2007 | Kozakai et al. | ............. 396/55 |

FOREIGN PATENT DOCUMENTS

JP 2007-94235 A 4/2007

\* cited by examiner

*Primary Examiner*—Rodney E Fuller
(74) *Attorney, Agent, or Firm*—Cantor Colburn LLP

(57) ABSTRACT

A lens drive device may include a thrust direction stopper mechanism which includes a thrust movement preventing abutting part of the movable body and a thrust movement preventing abutted part of the fixed body for restricting a moving range toward an object side of the movable body, and a radial direction stopper mechanism which includes a radial movement preventing abutting part of the movable body and a radial movement preventing abutted part of the fixed body for restricting a moving range in a radial direction of the movable body. The moving range in the radial direction under an inclined posture of the movable body with respect to an optic axis is restricted over all directions by the radial direction stopper mechanism and the thrust direction stopper mechanism.

17 Claims, 10 Drawing Sheets

LENS DRIVE DEVICE

CROSS REFERENCE TO RELATED APPLICATION

The present invention claims priority under 35 U.S.C. §119 to Japanese Application No. 2008-228802 filed Sep. 5, 2008, the entire contents of which are incorporated herein by reference.

FIELD OF THE INVENTION

At least an embodiment of the present invention may relate to a lens drive device in which a coil is held on a movable body having a lens.

BACKGROUND OF THE INVENTION

A lens drive device which is mounted on a cell phone with a camera or a digital camera includes a fixed body, a movable body having a lens, a magnetic drive mechanism for magnetically driving the movable body in an optical axis direction of the lens, and a spring member which is connected between the fixed body and the movable body. The movable body is driven in the optical axis direction by utilizing a thrust force of the magnetic drive mechanism and an urging force of the spring member.

In the lens drive device, when the movable body is largely shifted in the optical axis direction (thrust direction) or in the radial direction due to an impact from outside, the spring member may be largely deformed and plastic deformation or the like may occur in the spring member.

In order to prevent this problem, a thrust direction stopper mechanism is structured between the movable body and the fixed body so that a moving range toward an object to be photographed side of the movable body is restricted by abutting of a thrust movement preventing abutting part of the movable body with a thrust movement preventing abutted part of the fixed body, and a radial direction stopper mechanism is structured between the movable body and the fixed body so that a moving range in a radial direction of the movable body is restricted by abutting of a radial movement preventing abutting part of the movable body with a radial movement preventing abutted part of the fixed body (see Japanese Patent Laid-Open No. 2007-94235).

In the lens drive device, an impact from outside causes the movable body to displace in an obliquely inclined direction in addition to displacements in the thrust direction and the radial direction and, in some cases, the movable body may occur in the combined displacements.

However, in the conventional lens drive device, displacement in the radial direction under an obliquely inclined state of the movable body is not taken into consideration and thus the spring member may be largely deformed to incur plastic deformation. Further, when the movable body is shifted in the radial direction under an obliquely inclined state, an object side end part of the movable body may be caught by a light transmission opening formed in the top plate part to cause the movable body to be unable to return to its original state.

SUMMARY OF THE INVENTION

In view of the problems described above, at least an embodiment of the present invention may advantageously provide a lens drive device in which, even when the movable body is displaced due to an impact from outside, large deformation of the spring member and catching of the movable body by the light transmission opening are surely prevented.

According to at least an embodiment of the present invention, there may be provided a lens drive device including a fixed body, a movable body having a lens, a magnetic drive mechanism which includes a magnet disposed on the fixed body and a coil disposed on the movable body for magnetically driving the movable body in a lens optical axis direction, and a spring member which connects the movable body with the fixed body. The fixed body is provided with a top plate part for covering the movable body on an object to be photographed side and the top plate part is formed with a light transmission opening through which light is incident to the lens. The lens drive device further includes a thrust direction stopper mechanism which includes a thrust movement preventing abutting part of the movable body and a thrust movement preventing abutted part of the fixed body between the movable body and the fixed body for restricting a moving range toward the object to be photographed side of the movable body by abutting the thrust movement preventing abutting part with the thrust movement preventing abutted part, and a radial direction stopper mechanism which includes a radial movement preventing abutting part of the movable body and a radial movement preventing abutted part of the fixed body between the movable body and the fixed body for restricting a moving range in a radial direction of the movable body by abutting the radial movement preventing abutting part with the radial movement preventing abutted part. The thrust direction stopper mechanism and the radial direction stopper mechanism are provided with one of a structure continuously formed along an entire circumference and a structure formed at plural places in a circumferential direction; and the moving range in the radial direction under an inclined posture of the movable body with respect to an optic axis is restricted over all directions by the radial direction stopper mechanism and the thrust direction stopper mechanism.

In the embodiment of the present invention, the thrust direction stopper mechanism and the radial direction stopper mechanism are provided with one of a structure continuously formed along an entire circumference and a structure formed at plural places in a circumferential direction. Therefore, even when the movable body is shifted in any direction in the radial direction under an inclined posture with respect to the optic axis, the moving range is restricted over all directions by the radial direction stopper mechanism and the thrust direction stopper mechanism. Accordingly, even when the movable body is shifted in the radial direction due to an impact from the outside under an obliquely inclined state, the spring member is not deformed largely and thus the spring member can be surely prevented from occurring plastic deformation. Further, even when the movable body is shifted in the radial direction under the obliquely inclined state, the object side end part of the movable body can be surely prevented from being caught by the light transmission opening formed in the top plate part.

In accordance with an embodiment of the present invention, the radial movement preventing abutted part is provided with a dimension in which the radial movement preventing abutting part is capable of abutting with the radial movement preventing abutted part over all moving range in the thrust direction of the movable body. According to this structure, even when the movable body is located at any position in the thrust direction, the moving range in the radial direction is restricted even in a case that the movable body is obliquely inclined with respect to the optic axis.

In accordance with an embodiment of the present invention, the fixed body includes a base which is disposed on an imaging element side end part, the base is provided with four or more radial movement preventing abutted parts formed of a protruded part which is protruded toward the object to be photographed side in the circumferential direction, and the radial movement preventing abutted part is provided with a protruding dimension in which the radial movement preventing abutting part is capable of abutting with the radial movement preventing abutted part over all the moving range in the thrust direction of the movable body.

In accordance with an embodiment of the present invention, the thrust movement preventing abutting part is formed on an object side end face of the movable body in a circular or substantially circular shape having a larger diameter than the light transmission opening when viewed from the object side, and the thrust movement preventing abutted part is formed of a portion surrounding the light transmission opening in the top plate part.

In accordance with an embodiment of the present invention, the spring member is provided with a fixed body side connecting part which is held by the fixed body, a movable body side connecting part which is formed in a ring shape and connected with the movable body, and an arm part which connects the movable body side connecting part with the fixed body side connecting part, and the thrust movement preventing abutting part is disposed at an object side position with respect to the spring member in a circular or substantially circular shape having a smaller outer diameter dimension than an inner diameter dimension of the movable body side connecting part of the spring member. According to this structure, even when the movable body is inclined with respect to the optic axis, the spring member is not abutted with the top plate part and thus excessive deformation of the spring member is prevented.

In accordance with an embodiment of the present invention, the radial movement preventing abutting part is formed at plural separated positions in the optical axis direction. According to this structure, under an inclined posture of the movable body with respect to the optic axis, even when the movable body is further shifted in the inclined radial direction or, even when the movable body is shifted in the opposite radial direction, its moving range is surely restricted.

In accordance with an embodiment of the present invention, two radial movement preventing abutting parts which are adjacent to each other in the optical axis direction are protruded in the radial direction from the movable body to structure a winding part of the coil on an outer peripheral face of the movable body. For example, when the coil is comprised of a first coil and a second coil which are separately wound around in an optical axis direction, two radial movement preventing abutting parts are structured at separated positions in the optical axis direction by means of that the protruded parts are formed to structure winding parts of the first coil and the second coil.

In accordance with an embodiment of the present invention, the fixed body includes a base which is disposed on an imaging element side end part and a yoke which is fitted on the object side of the base, and the radial movement preventing abutted part is formed by the yoke. Specifically, the fixed body includes a base which is disposed on an imaging element side end part and a yoke which is fitted on the object to be photographed side of the base, the movable body includes a sleeve formed in a cylindrical shape, the coil of the magnetic drive mechanism is wound around an outer peripheral face of the sleeve, the magnet is comprised of four magnets which face the outer peripheral face of the coil, the yoke is formed in a substantially rectangular parallelepiped shape and provided with the top plate part and side plate parts, the four magnets are fixed to four corner portions of an inner peripheral face of the side plate parts of the yoke in a separated state in a circumferential direction, and the radial movement preventing abutting part is a protruded part which is protruded in a radial direction from the outer peripheral face of the sleeve to structure a winding part of the coil. In this case, it may be structured that, when the sleeve is displaced in the radial direction, displacement in the radial direction of the sleeve is restricted by abutting of the protruded part structuring the winding part of the coil with the side plate part of the yoke.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE PREFERRED EMBODIMENTS

An embodiment of the present invention will be described below with reference to the accompanying drawings. A lens drive device which will be described below is capable of being mounted on various electronic apparatuses in addition to a cell phone with a camera. For example, the lens drive device may be mounted on a thin-type digital camera, a PHS, a PDA, a bar code reader, a monitoring camera, a camera for rear confirmation in a car, a door having optical authentication function or the like or any other device.

Figure 1A:
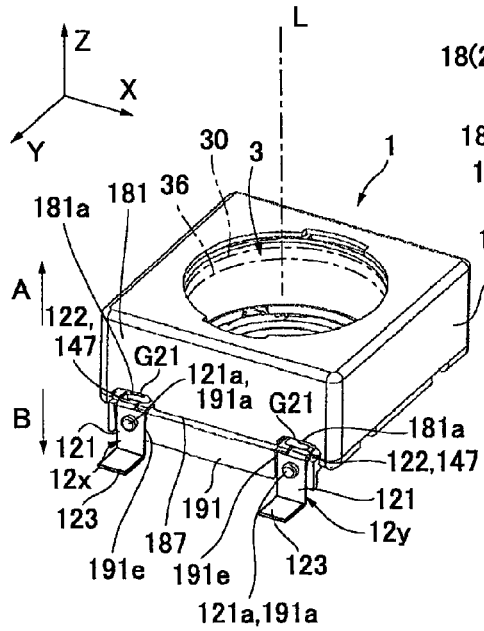
FIG. 1(a) is an outward appearance view showing a lens drive device in accordance with an embodiment of the present invention which is viewed from obliquely above.
Figure 1B:
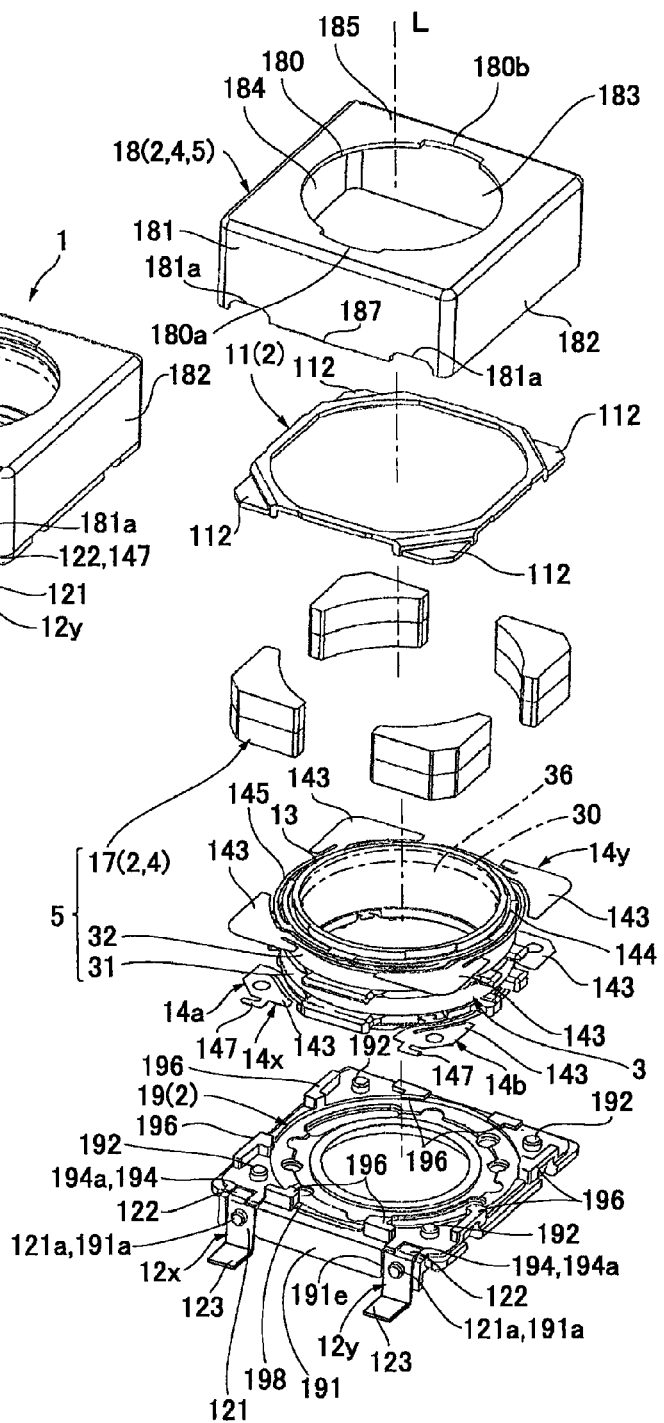
FIG. 1(b) is its exploded perspective view.
Figure 2A:
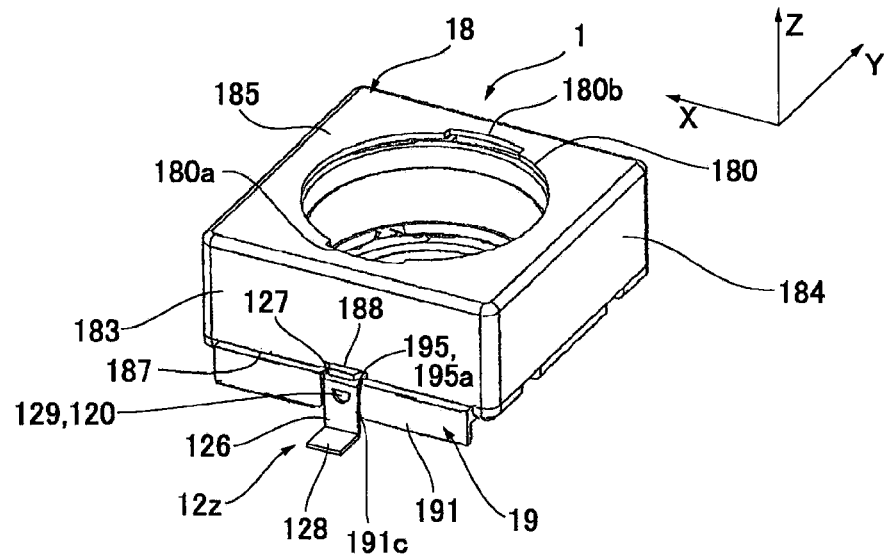
FIG. 2(a) is an outward appearance view showing a lens drive device in accordance with an embodiment of the present invention which is viewed from obliquely above in another direction.
Figure 2B:
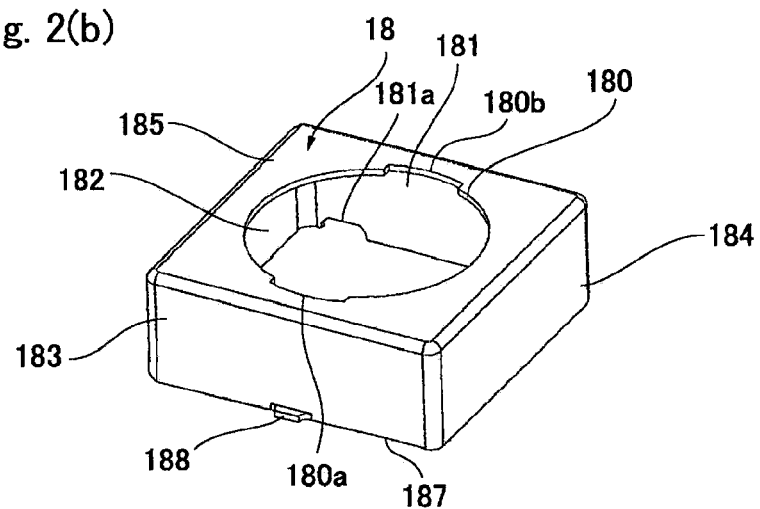
FIG. 2(b) is a perspective view showing a yoke.
Figure 2C:
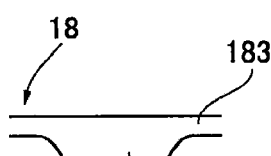
FIG. 2(c) is a plan view showing a protruded part of a yoke for soldering which is to be soldered with a ground terminal.
Figure 2D:
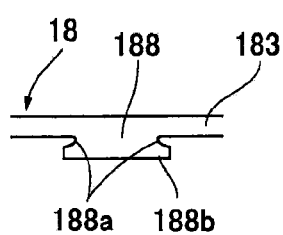
FIG. 2(d) is a plan view showing a modified example of a protruded part for soldering.
Figure 3A:
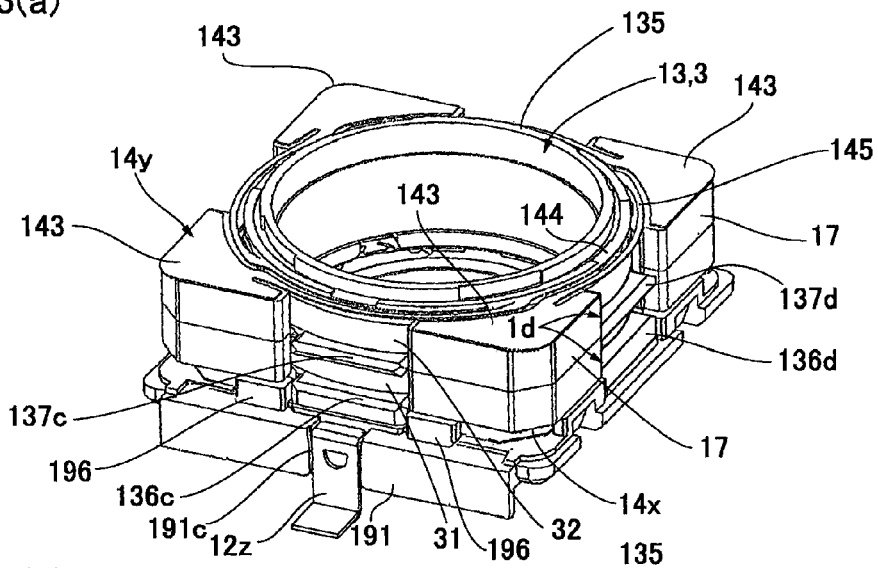
FIG. 3(a) is a perspective view showing a lens drive device in accordance with an embodiment of the present invention in which a yoke and a spacer are detached.
Figure 3B:
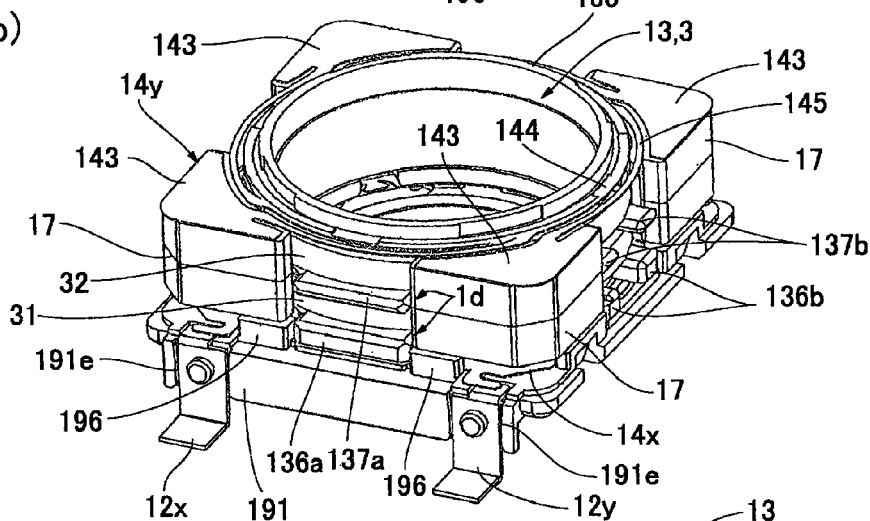
FIG. 3(b) is a perspective view showing its lens drive device which is viewed from another direction.
Figure 3C:
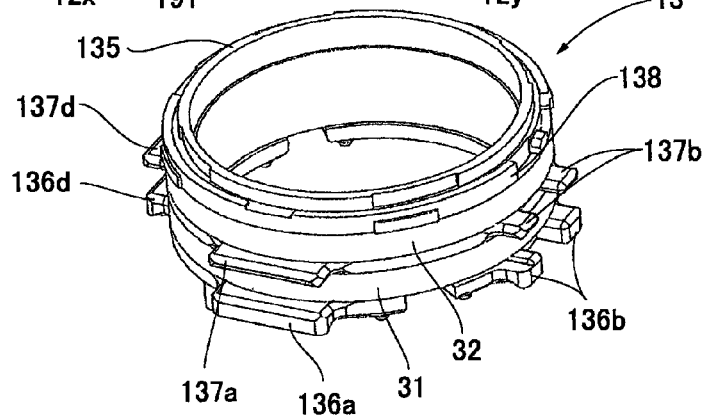
FIG. 3(c) is a perspective view showing a movable body.
Figure 4A:
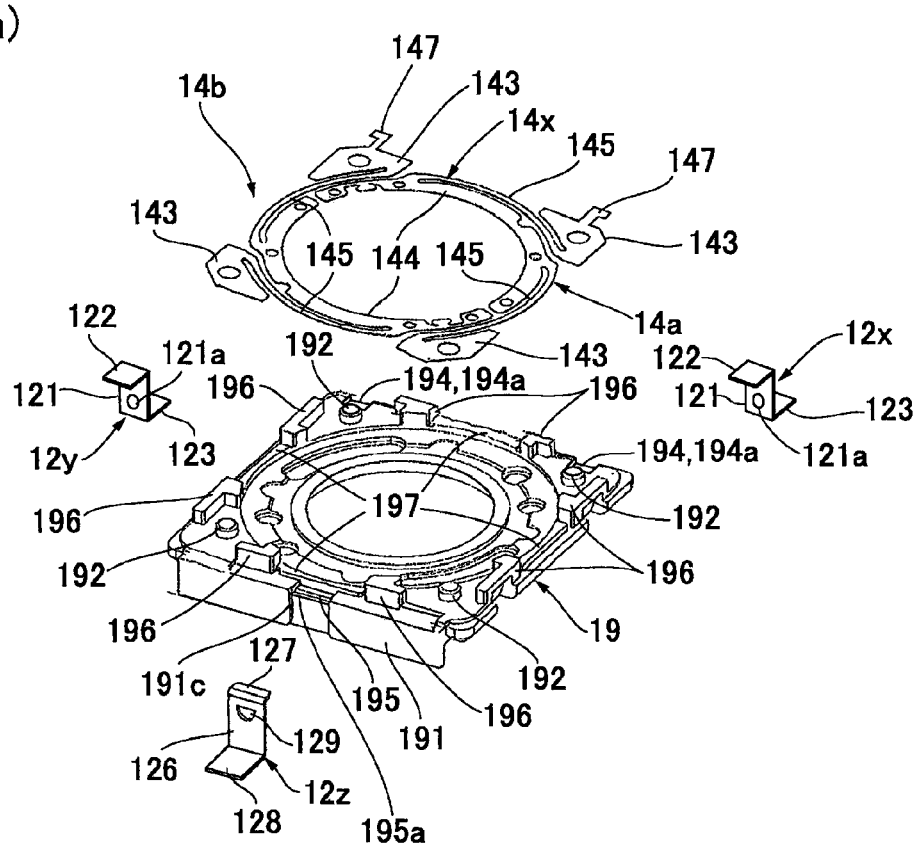
FIG. 4(a) is an exploded perspective view showing a terminal structure in a lens drive device in accordance with an embodiment of the present invention.
Figure 4B:
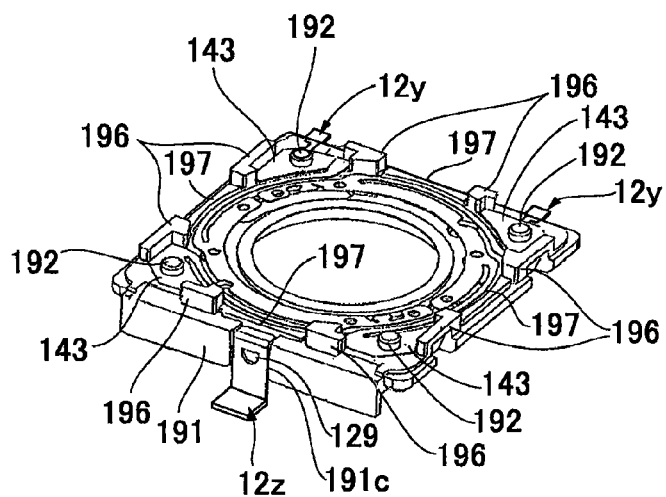
FIG. 4(b) is a perspective view showing a state where a terminal is attached to a holder.

FIG. 1(a) is an outward appearance view showing a lens drive device in accordance with an embodiment of the present invention which is viewed from obliquely above, and FIG. 1(b) is its exploded perspective view. FIG. 2(a) is an outward appearance view showing a lens drive device in accordance with an embodiment of the present invention which is viewed from obliquely above in another direction, FIG. 2(b) is a perspective view showing a yoke, FIG. 2(c) is a plan view showing a protruded part of a yoke for soldering which is to be soldered with a ground terminal, and FIG. 2(d) is a plan view showing a modified example of a protruded part for soldering. FIG. 3(a) is a perspective view showing a lens drive device in accordance with an embodiment of the present invention in which a yoke and a spacer are detached, FIG. 3(b) is a perspective view showing its lens drive device which is viewed from another direction, and FIG. 3(c) is a perspective view showing a movable body 3. FIG. 4(a) is an exploded perspective view showing a terminal structure in a lens drive device in accordance with an embodiment of the present invention, and FIG. 4(b) is a perspective view showing a state where a terminal is attached to a holder.

In FIGS. 1(a), 1(b) and FIG. 2(a), a lens drive device 1 in this embodiment is structured so that a lens 36 and a diaphragm are moved along an optical axis direction "L" (lens optical axis direction/thrust direction) in both of an "A"-direction (front side) toward an object to be photographed (object side) and a "B"-direction (rear side) toward an opposite side (image side) to the object to be photographed in a thin camera which is used in a cell phone with a camera or the like. The lens drive device 1 is formed in a substantially rectangular parallelepiped shape. The lens drive device 1 includes a movable body 3, which is provided with a cylindrical lens holder 30 generally having one or plural pieces of lenses 36 and a fixed diaphragm in its inside, a magnetic drive mechanism 5 for moving the movable body 3 along the optical axis direction "L", and a fixed body 2 on which the magnetic drive mechanism 5, the movable body 3 and the like are mounted. The movable body 3 includes a sleeve 13 formed in a cylindrical shape and the lens holder 30 in a cylindrical shape is fixed on its inside. Therefore, an outward shape of the movable body 3 is determined by the sleeve 13 and formed in a roughly circular cylindrical shape.

The fixed body 2 includes a holder 19 (base) made of a rectangular resin plate for holding an imaging element (not shown) on an image side, and includes a box-shaped yoke 18 and a rectangular frame-shaped spacer 11 on the object to be photographed side. The yoke 18 is structured of a ferromagnetic plate such as a steel plate. As described below, together with a magnet 17, the yoke 18 structures an interlinkage magnetic field generating body 4 for generating an interlinkage magnetic field in a first coil 31 and a second coil 32 which are held by the sleeve 13. The yoke 18 is also used as a shield member.

As shown in FIG. 1(b) and FIGS. 3(a), 3(b) and 3(c), the magnetic drive mechanism 5 includes the first coil 31 and the second coil 32, which are wound around an outer peripheral face of the sleeve 13 so as to be divided in the optical axis direction, and the interlinkage magnetic field generating body 4 for generating an interlinkage magnetic field in the first coil 31 and the second coil 32. The magnetic drive mechanism 5 is structured of the first coil 31, the second coil 32 and the interlinkage magnetic field generating body 4. The interlinkage magnetic field generating body 4 includes four magnets 17 and the yoke 18 which are faced with the first coil 31 and the second coil 32 on their outer peripheral sides.

Each of the four magnets 17 is formed in a roughly triangular prism shape and the four magnets 17 are fixed at four corner portions of the inner peripheral face of the yoke 18, which is formed in a substantially rectangular parallelepiped shape, in a separated state in the circumferential direction. In a case that the magnet 17 is divided and disposed at four corners as described above, even when a space between the yoke 18 and the sleeve 13 becomes narrow at a center portion of a side part of the yoke 18, the magnet 17 is prevented from being provided with a very thin portion and thus the strength of the magnet 17 is enhanced. Further, a magnetic force of the magnet 17 can be efficiently applied to the first coil 31 and the second coil 32 which are mounted on the movable body 3. In addition, since spaces at the four corners between the movable body 3 and the yoke 18 are efficiently utilized as an arrangement space of the magnet 17, the entire size of the lens drive device 1 can be reduced.

In this embodiment, each of four magnets 17 is divided into two pieces in the optical axis direction "L" and is magnetized so that its inside face and its outside face are magnetized to be different from each other. The four magnets 17 are, for example, magnetized so that inside faces of their upper half portions are magnetized to be an "N"-pole and their outside faces are magnetized to be an "S"-pole, and are magnetized so that inside faces of their lower half portions are magnetized to be an "S"-pole and their outside faces are magnetized to be an "N"-pole. Therefore, winding directions of a coil wire of the first coil 31 and the second coil 32, which are comprised of one wire but divided in the optical axis direction, are opposite to each other.

In the movable body 3, an outer peripheral face of an end part on the imaging element side of the sleeve 13 is formed with four protruded parts 136a, 136b, 136c and 136d in the circumferential direction. Further, an outer peripheral face at a roughly intermediate position in the thrust direction of the sleeve 13 is also formed with four protruded parts 137a, 137b, 137c and 137d in the circumferential direction. In addition, an outer peripheral face of an object side end part of the sleeve 13 is formed with a protruded part 138 which is in a roughly ring shape over the entire circumference. In this manner, the outer peripheral face of the sleeve 13 is formed with a winding part for the first coil 31 by using the protruded parts 136a, 136b, 136c and 136d and the protruded parts 137a, 137b, 137c and 137d, and a winding part for the second coil 32 by using the protruded part 138 and the protruded parts 137a, 137b, 137c and 137d.

As shown in FIGS. 1(a) and 1(b), the yoke 18 is a drawing worked product made of metal whose thickness is about 150 μm. The yoke 18 is provided with a rectangular top plate part 185 which covers the movable body 3 on the object side, and four side plate parts 181, 182, 183 and 184 which surround the first coil 31 and the second coil 32 on the outer peripheral side. The yoke 18 is provided with a function for reducing leakage flux from magnetic paths which are structured between the magnet 17 and the first coil 31 and the second coil 32. According to this structure, linearity between a moving amount of the movable body 3 and an electric current supplied to the first coil 31 and the second coil 32 can be improved. A circular light transmission opening 180 is formed at the center of the top plate part 185 of the yoke 18 for taking light into the lens 36 from an object to be photographed.

In this embodiment, the yoke 18 is also utilized as a shield member which covers the movable body 3 and the magnetic drive mechanism 5. The yoke 18 is mounted in the state where the imaging element side end parts 187 of the side plate parts 181, 182, 183 and 184 are abutted with a face on the object to be photographed side of the holder 19. Therefore, the yoke 18 is mounted on the face of the holder 19 located on the object side as a reference and the reference face of the holder 19 determines the positions in the optical axis direction "L" of the magnet 17 and the like and the entire dimension of the lens drive device 1.

As shown in FIG. 1(b), FIGS. 3(a) and 3(b) and FIGS. 4(a) and 4(b), the lens drive device 1 in this embodiment includes a first spring member 14x and a second spring member 14y which are disposed between the holder 19 and the sleeve 13 (imaging element side) and between the spacer 11 and the sleeve 13 (object to be photographed side) so that the movable body 3 is connected with the fixed body 2. Each of the first spring member 14x and the second spring member 14y is made of metal such as beryllium copper or SUS steel material and is formed by means of that a thin plate whose thickness is about 80 μm is performed by press working or etching processing using photo lithography technique. Further, each of the first spring member 14x and the second spring member 14y is provided with four fixed body side connecting parts 143, which are disposed on outer sides and held by the fixed body 2, a circular ring frame-shaped movable body side connecting part 144, which is disposed on an inner side and connected with the end part of the sleeve 13, and four arm parts 145 which connect the fixed body side connecting parts 143 with the movable body side connecting part 144.

The first spring member 14x is connected with the holder 19 and the sleeve 13 and the movable body 3 is set to be in a supported state by the fixed body 2 so as to be capable of moving along the optical axis of the lens 36. The second spring member 14y is connected with the spacer 11 and the sleeve 13 and the movable body 3 is set to be in a supported state by the fixed body 2 so as to be capable of moving along the optical axis of the lens 36.

As shown in FIGS. 4(a) and 4(b), the first spring member 14x which is disposed on the holder 19 side is divided into two pieces, i.e., two spring pieces 14a and 14b. Two end parts (winding start and winding end) of the first coil 31 and the second coil 32 are connected with the spring pieces 14a and 14b. Therefore, the first spring member 14x (spring pieces 14a and 14b) functions as a power supply member to the first coil 31 and the second coil 32.

The spring pieces 14a and 14b may be applied with bending work and drawn to outside of the fixed body 2 to be utilized to electrically connect with the outside. However, in this embodiment, power supply terminals 12x and 12y separated from the spring pieces 14a and 14b and the yoke 18 are used and fixed to the holder 19.

A face on the object to be photographed side of the holder 19 is formed at four corners with small protruded parts 192 extending toward the object to be photographed side. The small protruded parts 192 of the holder 19 are used to hold the first spring member 14x. Further, the face on the object side of the holder 19 is formed with column-shaped protruded parts 196 which are protruded toward the object side at plural locations in the circumferential direction. The column-shaped protruded parts 196 are used as magnet support parts which support end faces on the imaging element side of the magnets 17. In this embodiment, the column-shaped protruded parts 196 are disposed to face each other across center portions of sides of the holder 19 to be utilized as radial movement preventing abutted parts as described below.

In FIGS. 1(a) and 1(b), the spacer 11 is attached to an inside face of the top plate part 185 of the yoke 18 and the spacer 11 is formed at four corners with triangular spring pressing parts 112 which are protruded toward the imaging element side. The spring pressing part 112 holds the fixed body side connecting part 143 of the second spring member 14y between the end face on the object side of the magnet 17 and the spring pressing part 112.

As shown in FIGS. 1(a) and 1(b), FIG. 3(b) and FIGS. 4(a) and 4(b), two power supply terminals 12x and 12y are protruded outside from the yoke 18 in the lens drive device 1 in this embodiment. The power supply terminals 12x and 12y are structured of different structural members from the spring member 14x and the yoke 18, and they are made by press working of a metal plate whose thickness is about 200 μm. Each of the two power supply terminals 12x and 12y is provided with a plate-like part 121, which is extended in the optical axis direction "L" along a side wall face 191 of the holder 19, an inside connecting terminal part 122, which is bent from an upper end part of the plate-like part 121 toward inside of the yoke 18, and an outside connecting terminal part 123 which is bent from a lower end part of the plate-like part 121 toward an opposite side (outside) to the inside connecting terminal part 122. The power supply terminals 12x and 12y are drawn toward outside from portions on the object side of the holder 19 on which the imaging element side end part 187 of the yoke 18 is superposed. The plate-like part 121 is formed with a circular opening 121a. A small protruded part 191a which is protruded from the side wall face 191 of the holder 19 is fitted into the opening 121a. The plate-like part 121 is fitted into a groove 191e formed on the side wall face 191 of the holder 19. The inside connecting terminal parts 122 of the power supply terminals 12x and 12y are connected with end parts 147 of the first spring member 14x by soldering.

A corner part on the object side face of the holder 19 is formed with a recessed part 194 at an overlapped portion with the inside connecting terminal parts 122 of the power supply terminals 12x and 12y. A face of a bottom part of the recessed part 194 supports a face of the inside connecting terminal part 122, which is located on an opposite side to the object to be photographed side (face on the imaging element side), as a power supply terminal support part 194a. Further, the yoke 18 is formed with cut-out parts 181a on the imaging element side end part 187 of the side plate part 181. Therefore, a gap space "G21" is formed between the object side face of the end part 147 of the spring member 14x and the imaging element side end part 187 of the yoke 18. Accordingly, the power supply terminals 12x and 12y do not form an unnecessary gap space between abutting portions of the holder 19 and the yoke 18. Therefore, even when the yoke 18 is superposed on the holder 19 with the holder 19 as a reference, the entire size of the lens drive device 1 is not affected.

Figure 5A:
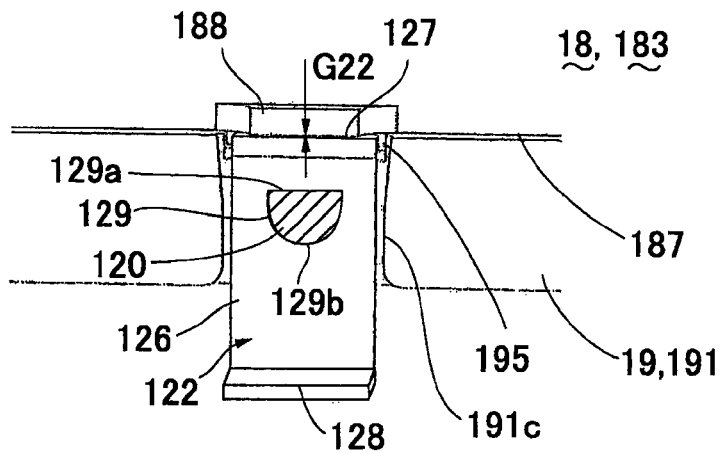
FIGS. 5(a), 5(b) and 5(c) are front views showing a connection structure of a ground terminal with a yoke in a lens drive device in accordance with an embodiment of the present invention.
Figure 5B:
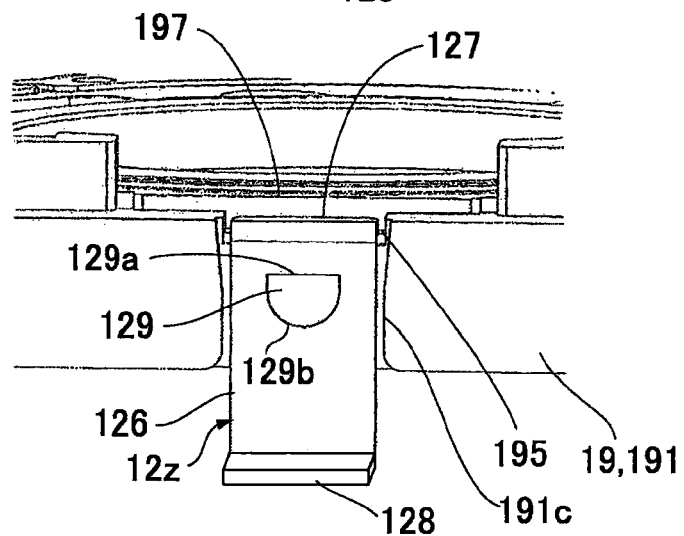
Figure 5C:
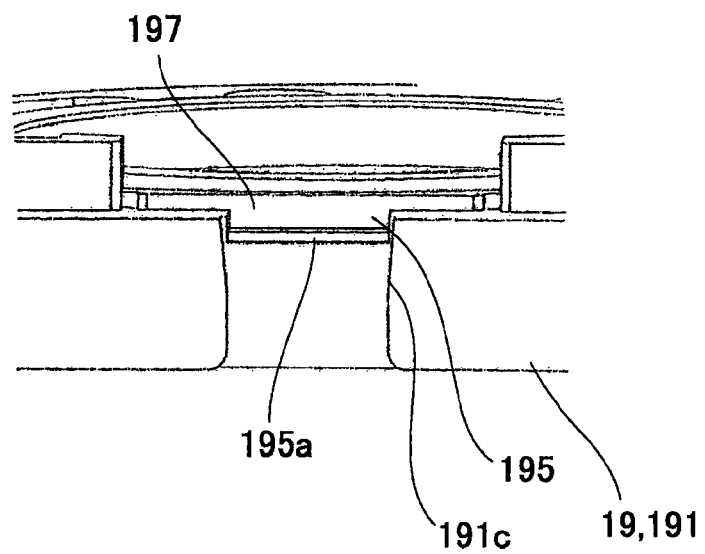
Figure 6A:
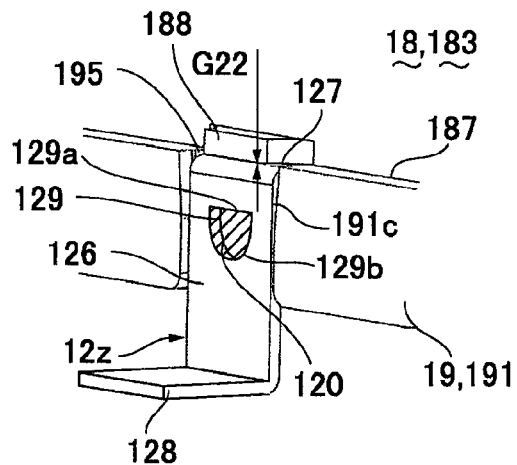
FIGS. 6(a), 6(b) and 6(c) are perspective views showing a connection structure of a ground terminal with a yoke in a lens drive device in accordance with an embodiment of the present invention.
Figure 6B:
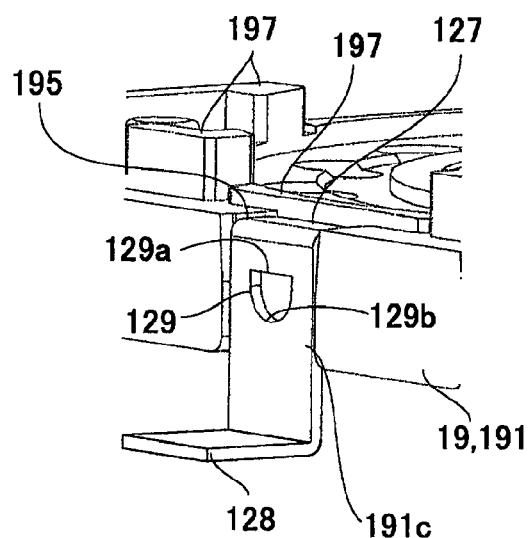
Figure 6C:
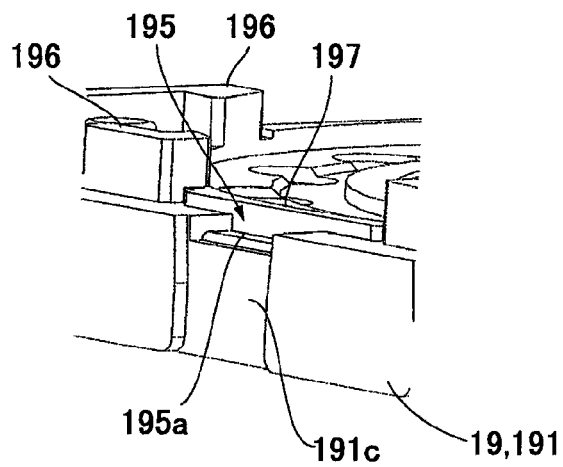
Figure 7A:
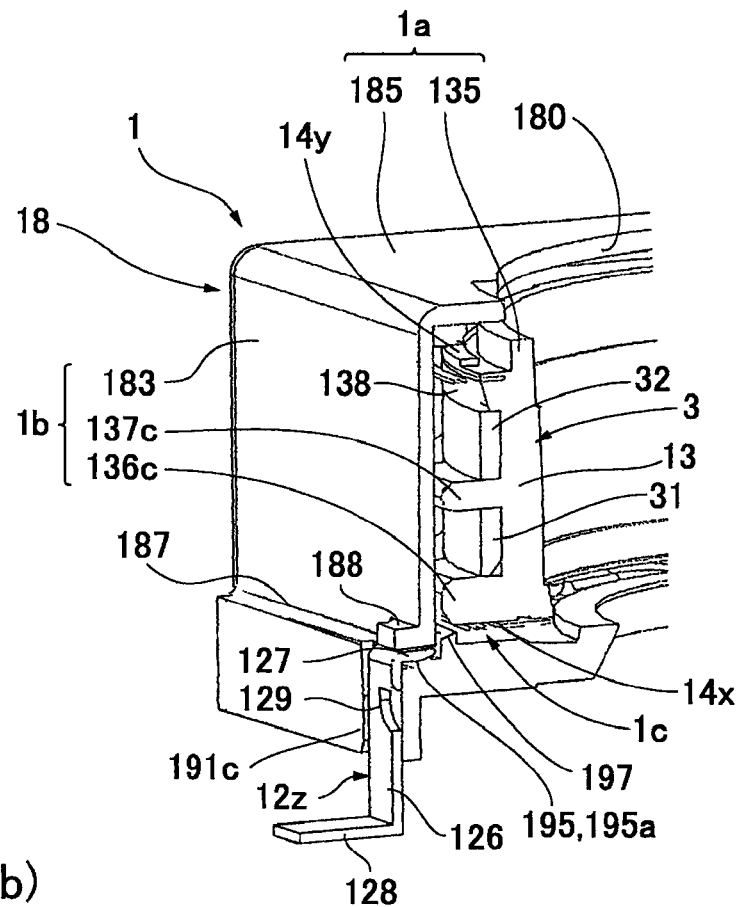
FIG. 7(a) is a longitudinal sectional view showing a lens drive device in accordance with an embodiment of the present invention which is cut at a position passing through a ground terminal.
Figure 7B:
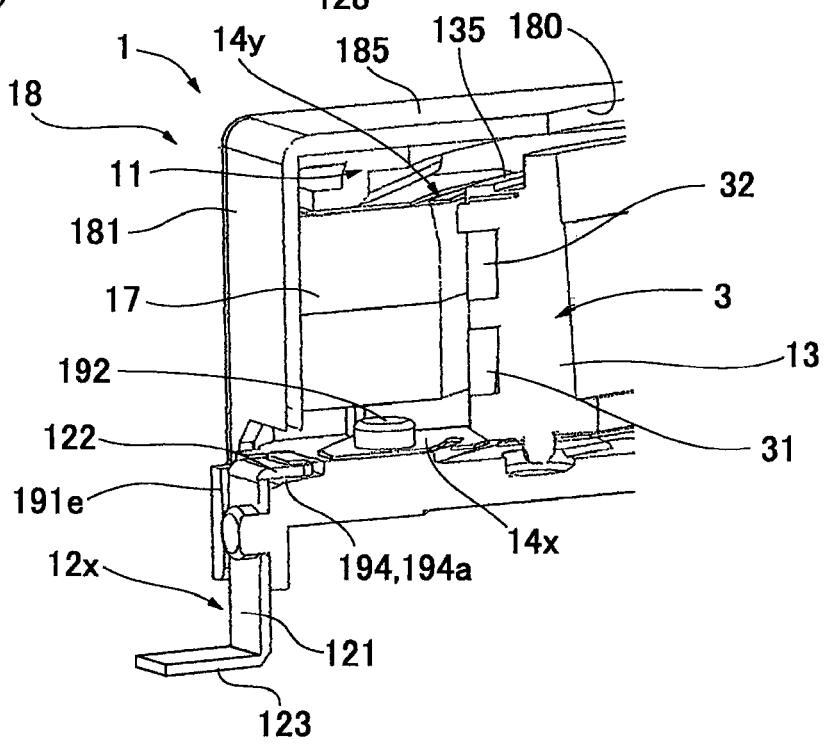
FIG. 7(b) is its longitudinal sectional view which is cut at a position passing through a power supply terminal.

FIGS. 5(a), 5(b) and 5(c) are front views showing a connection structure of the ground terminal 12z with the yoke 18 in the lens drive device 1 in accordance with an embodiment of the present invention. FIG. 5(a) is a front view showing the ground terminal 12z in the lens drive device 1 in accordance with an embodiment of the present invention, FIG. 5(b) is a front view showing a state where the yoke 18 is detached, and FIG. 5(c) is a front view showing the holder 19 in a state where the ground terminal 12z is detached. FIGS. 6(a), 6(b) and 6(c) are perspective views showing a connection structure of the ground terminal 12z with the yoke 18 in the lens drive device 1 in accordance with an embodiment of the present invention. FIG. 6(a) is a perspective view showing the ground terminal 12z in the lens drive device 1 in accordance with an embodiment of the present invention, FIG. 6(b) is a perspective view showing a state where the yoke 18 is detached, and FIG. 6(c) is a perspective view showing the holder 19 in a state where the ground terminal 12z is detached. FIG. 7(a) is a longitudinal sectional view showing the lens drive device 1 in accordance with an embodiment of the present invention which is cut at a position passing through the ground terminal 12z, and FIG. 7(b) is its longitudinal sectional view which is cut at a position passing through the power supply terminal 12x.

In FIGS. 2(a) and 2(b), FIG. 3(a), FIGS. 4(a) and 4(b), FIGS. 5(a), 5(b) and 5(c), FIGS. 6(a), 6(b) and 6(c) and FIG. 7(a), the lens drive device 1 in this embodiment utilizes the yoke 18 as a shield member for preventing electromagnetic noises from penetrating inside from outside or from being transmitted outside from inside. Therefore, one piece of the ground terminal 12z is protruded outside from the yoke 18 and the ground terminal 12z is electrically connected with the yoke 18. The ground terminal 12z is, similarly to the power supply terminals 12x and 12y, structured of a different structural member from the spring member 14x and the yoke 18, and the ground terminal 12z is formed of a worked metal plate whose thickness is different from those of the spring member 14x and the yoke 18. For example, the ground terminal 12z is thicker than the spring member 14x and the yoke 18, and is, for example, formed by means of that a metal plate whose thickness is about 200 μm is bent by press working. Further, the ground terminal 12z and the yoke 18 are performed with surface treatment so as to be easily soldered. The ground terminal 12z is structured similarly to the power supply terminals 12x and 12y.

In this embodiment, the ground terminal 12z is provided with a plate-like part 126, which is extended in the optical axis direction "L" along the side wall face 191 of the holder 19, a yoke connecting terminal part 127, which is bent from an upper end part of the plate-like part 126 toward inside of the yoke 18, and an outside connecting terminal part 128 which is bent from a lower end part of the plate-like part 126 toward an opposite side (outside of the yoke 18) to the yoke connecting terminal part 127. The ground terminal 12z is drawn toward outside from a part of overlapped portion of the imaging element side end part 187 of the yoke 18 and the object side face of the holder 19. The plate-like part 126 is fitted to a groove 191c which is formed on the side wall face 191 of the holder 19.

A side part on the object side face of the holder 19 is formed with a recessed part 195 at an overlapped portion with the yoke connecting terminal part 127 of the ground terminal 12z. A face of a bottom part of the recessed part 195 supports a face of the yoke connecting terminal part 127, which is located on an opposite side to the object to be photographed side (face on the imaging element side), as a ground terminal support part 195a. On the other hand, a cut-out part is not formed in the imaging element side end part 187 of the side plate part 183 of the yoke 18. However, a depth dimension of the recessed part 195 is larger than a thickness dimension of the yoke connecting terminal part 127 and thus a gap space "G22" is formed between the object side face of the ground terminal 12z and the imaging element side end part 187 of the yoke 18.

The object side face of the yoke connecting terminal part 127 of the ground terminal 12z is connected with an outer face of the side plate part 183 of the yoke 18 by soldering, welding or the like. In this embodiment, the side plate part 183 of the yoke 18 is formed with a protruded part 188 for soldering so as to overlap the yoke connecting terminal part 127 on the object side and the protruded part 188 and the yoke connecting terminal part 127 are connected with each other by soldering. According to this structure, in comparison with a case that the yoke connecting terminal part 127 is soldered to a flat plate portion of the side plate part 183 of the yoke 18, since the protruded part 188 for soldering is formed, a soldering area between the protruded part 188 and the yoke connecting terminal part 127 becomes larger. Further, in this embodiment, both of the ground terminal 12z and the yoke 18 are soldered at portions other than a fracture face and thus soldering work is easily and surely performed in comparison with a case that a fracture face is soldered.

As shown in FIG. 2(c), the protruded part 188 for soldering is protruded in a roughly rectangular shape from the side plate part 183 of the yoke 18. Both end parts of the protruded part 188 in the longitudinal direction are curved and connected with the outer face of the side plate part 183. In accordance with an embodiment of the present invention, as shown in FIG. 2(d), cut-out parts 188a may be formed to recess deeply at both end parts of the protruded part 188 for soldering and the tip end part 188b may be projected laterally. In this case, heat capacity becomes smaller. Therefore, soldering work of the yoke connecting terminal part 127 with the protruded part 188 for soldering is easily and surely performed.

In this embodiment, the side wall face 191 of the holder 19 is protruded further outer side from the side plate part 183 of the yoke 18 as a terminal fixing part. Therefore, the ground terminal support part 195a is protruded further outer side from the side plate part 183 of the yoke 18. Accordingly, soldering portion of the protruded part 188 to the yoke connecting terminal part 127 is located on further outer side of the side plate part 183 of the yoke 18. As a result, since the soldering portion of the protruded part 188 to the connecting terminal part 127 are located apart from the magnets 17, the magnets 17 are not deteriorated due to heat at the time of soldering. In other words, in this embodiment, the ground terminal 12z is disposed at a separated position in the circumferential direction from two magnets 17, which are fixed in the separated state at the corner portions of the yoke 18, so that heat at the time of soldering of the ground terminal 12z does not affect the magnets 17. In addition, in this embodiment, the soldering portion between the protruded part 188 and the yoke connecting terminal part 127 is located apart from the magnets 17 and thus the magnets 17 can be surely prevented from deteriorating due to heat at the time of soldering.

In FIGS. 2(a) and 2(b), FIGS. 4(a) and 4(b), FIGS. 5(a), 5(b) and 5(c), FIGS. 6(a), 6(b) and 6(c) and FIG. 7(a), the plate-like part 126 of the ground terminal 12z is formed with a semicircular-shaped opening 129 whose inner diameter is about 0.8 mm. The opening 129 is formed so that a side located on the soldering portion (overlapped portion of the yoke connecting terminal part 127 with the protruded part 188 of the yoke 18) is a straight part 129a and that an opposite side to the soldering portion is a circular arc-shaped part 129b. According to this structure, when the yoke connecting terminal part 127 is to be soldered with the protruded part 188 for soldering, heat of solder is hard to be transmitted toward the tip end side of the ground terminal 12z and thus spreading region of the solder is restricted. Therefore, soldering between the yoke connecting terminal part 127 and the protruded part 188 can be performed surely.

After the yoke connecting terminal part 127 and the protruded part 188 of the yoke 18 have been soldered with each other, an adhesive 120 is filled to the inside of the opening 129. As a result, the ground terminal 12z and the holder 19 are adhesively fixed to each other by the adhesive 120 in the opening 129.

The holder 19 is formed with a protruded part 197 protruding toward the object side at a position adjacent and inside in the radial direction of the recessed part 195. The protruded part 197 is located on an inner side in the radial direction of the gap space "G22" which is formed between the object side face of the yoke connecting terminal part 127 and the imaging element side end part 187 of the yoke 18. The protruded part 197 is also formed at positions corresponding to three other sides of the holder 19. In this embodiment, the protruded parts 197 are located on outer sides in the radial direction of the imaging element side end part of the movable body 3 (sleeve 13) and overlapped with the protruded parts 136a, 136b, 136c and 136d which are protruded from the sleeve 13 toward outer sides in the radial direction. Therefore, during assembly of the lens drive device 1 and, when an electric current is not supplied to the first coil 31 and the second coil 32, a magnetic thrust force is not applied to the movable body 3 and thus the sleeve 13 is located on the imaging element side. However, in this embodiment, since the protruded parts 136a, 136b, 136c and 136d are abutted with the protruded parts 197, the movable body 3 (sleeve 13) is in a slightly floated state from the holder 19. Therefore, in a case that the yoke connecting terminal part 127 and the protruded part 188 of the yoke 18 are soldered with each other, even when flux enters into the inside in the radial direction, the flux does not adhere to the lower end face of the sleeve 13. Further, the flux does not adhere so as to extend over the movable body 3 and the holder 19. In addition, the flux does not adhere to the arm part 145 of the first spring member 14x. Therefore, movement of the movable body 3 and normal deformation of the arm part 145 of the first spring member 14x are prevented from being disturbed by adhesion of the flux.

In other words, as shown in FIG. 7(b), since the power supply terminals 12x and 12y are required to be connected with the first spring member 14x, the power supply terminals 12x and 12y and the movable body 3 are sufficiently separated from each other. In addition, as shown in FIG. 7(a), although the ground terminal 12z is disposed in the vicinity of the movable body 3, flux is prevented from adhering to the movable body 3 and the spring portion of the first spring member 14x by the protruded parts 197.

As described above, in this embodiment, the ground terminal 12z is formed of a structural member which is different from a shield member or a spring member. Therefore, the ground terminal is capable of being used which is superior in characteristic as a terminal such as a sufficient mechanical strength without affected by material, thickness or the like of the yoke 18 (shield member) and the first spring member 14x. Further, the ground terminal 12z is drawn outside in the state that the ground terminal support part 195a, which is the bottom part of the recessed part 195 formed in the holder 19, supports the ground terminal 12z in a face to face manner. Therefore, the ground terminal 12z can be held by the fixed body in a stable state and soldering can be performed easily. In addition, the holder 19 and the yoke 18 are directly abutted with each other except the portion where the ground terminal 12z is disposed. However, the gap space "G22" is formed between the object side face of the ground terminal 12z and the imaging element side end part 187 of the yoke 18 and thus the ground terminal 12z does not cause between the abutting portions of the holder 19 with the yoke 18 to occur an unnecessary gap space. Therefore, even when the yoke 18 is superposed on the holder 19 with the holder 19 as a reference, the entire size of the lens drive device 1 is not affected.

Further, similarly to the ground terminal 12z, the power supply terminals 12x and 12y are formed of a structural member which is different from the shield member or the spring member. Therefore, the power supply terminals 12x and 12y which are superior in characteristic as a terminal such as a sufficient mechanical strength can be secured without affected by material, thickness or the like of the first spring member 14x.

Further, the ground terminal support part 195a is the bottom part of the recessed part 195 which is deeper than a thickness dimension of the ground terminal 12z. Therefore, even when the imaging element side end part 187 of the side plate part 183 of the yoke 18 is not formed in a complicated shape, the gap space "G22" can be formed between the object side face of the ground terminal 12z and the imaging element side end part 187 of the yoke 18.

In the embodiment described above, the power supply terminals 12x and 12y are disposed at positions in the side plate part 181 of the yoke 18 and the ground terminal 12z is disposed at a position in the side plate part 183 of the yoke 18. However, arrangement positions of the power supply terminals 12x and 12y and the ground terminal 12z are not limited to this embodiment and they may be arranged at any position.

Figure 8:
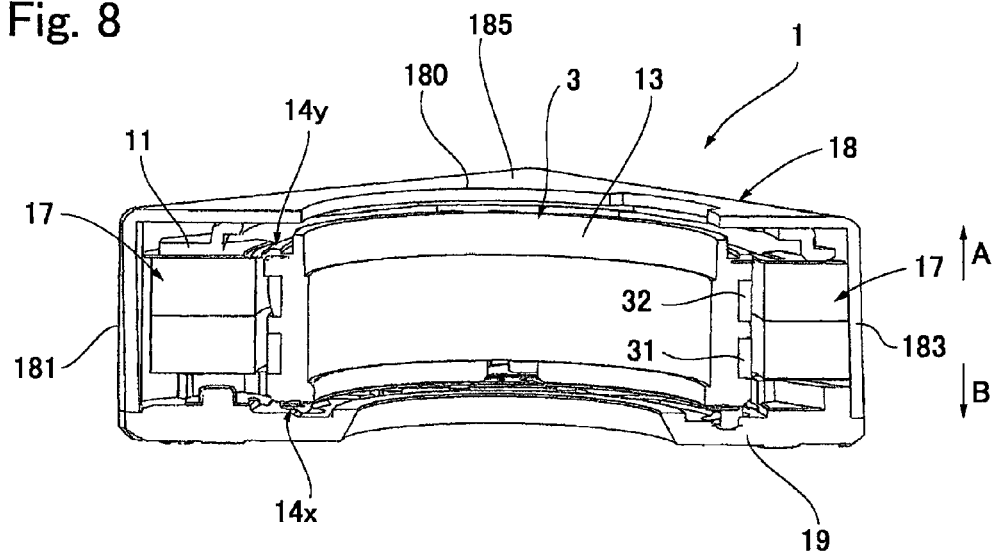
FIG. 8 is a longitudinal sectional view showing a lens drive device in accordance with an embodiment of the present invention which is cut at a position passing through its diagonal line.

FIG. 8 is a longitudinal sectional view showing a lens drive device in accordance with an embodiment of the present invention which is cut at a position passing through its diagonal line. In FIG. 8, in the lens drive device 1 in this embodiment, the movable body 3 is normally located on the imaging element side (image side). In this state, when an electric current is supplied to the first coil 31 and the second coil 32 in a predetermined direction, an upward (front side) electromagnetic force is applied to the first coil 31 and the second coil 32 respectively. Therefore, the sleeve 13 to which the first coil 31 and the second coil 32 are fixed begins to move toward the object side (front side/direction shown by the arrow "A"). In this case, elastic forces which restrict movement of the sleeve 13 are respectively occurred between the second spring member 14y and the front end of the sleeve 13 and between the first spring member 14x and the rear end of the sleeve 13. Therefore, the sleeve 13 stops when the electro-magnetic force for moving the sleeve 13 toward the front side and the elastic force for restricting the movement of the sleeve 13 are balanced with each other. In this case, when an amount of the electric current supplied to the first coil 31 and the second coil 32 is adjusted according to the elastic force acting on the sleeve 13 by the first spring member 14x and the second spring member 14y, the sleeve 13 (movable body 3) can be stopped at a desired position.

In this embodiment, a flat spring (gimbal spring), which is provided with a linear relationship between an elastic force (stress) and displacement amount (distortion amount), is used as the first spring member 14x and the second spring member 14y. Therefore, linearity between a moving amount of the sleeve 13 and an electric current supplied to the first coil 31 and the second coil 32 can be improved. Further, two spring members comprised of the first spring member 14x and the second spring member 14y are used and thus, when the sleeve 13 is stopped, large balanced forces are applied in the optical axis direction. Therefore, even when a centrifugal force, an impact force or the like is acted in the optical axis direction, the sleeve 13 can be stopped further stably. In addition, in order to stop the sleeve 13 in the lens drive device 1, instead of making the sleeve 13 collide with a collided member (buffer material), in this embodiment, the sleeve 13 is stopped by utilizing the balance of the electro-magnetic force and the elastic force and thus a collision noise can be prevented.

Figure 9A:
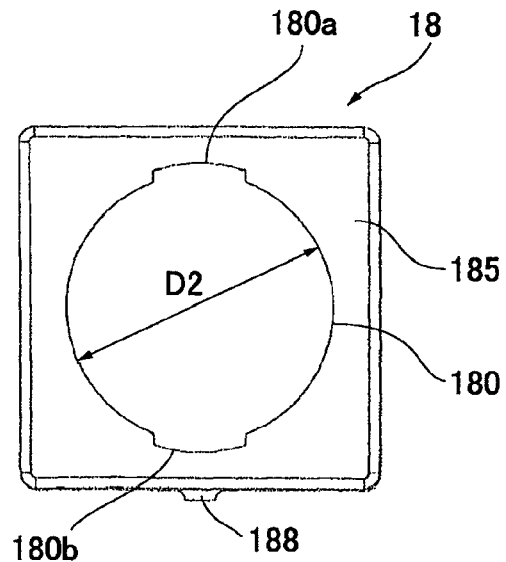
FIG. 9(a) is a plan view showing a yoke in a lens drive device in accordance with an embodiment of the present invention.
Figure 9B:
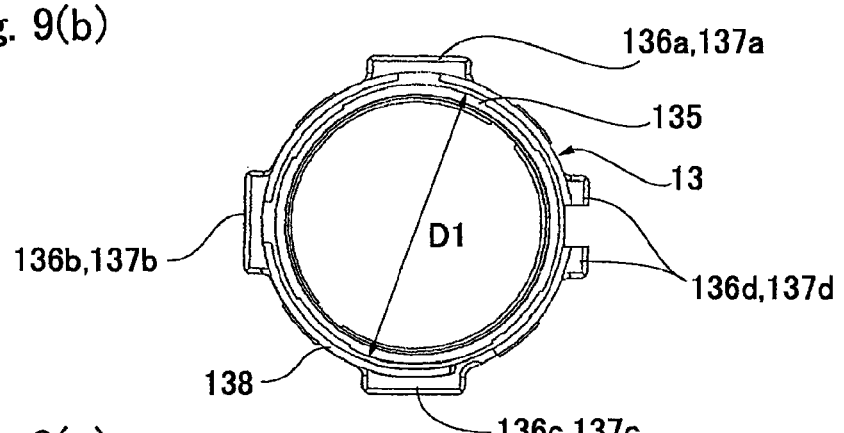
FIG. 9(b) is a plan view showing a sleeve which is used in a movable body.
Figure 9C:
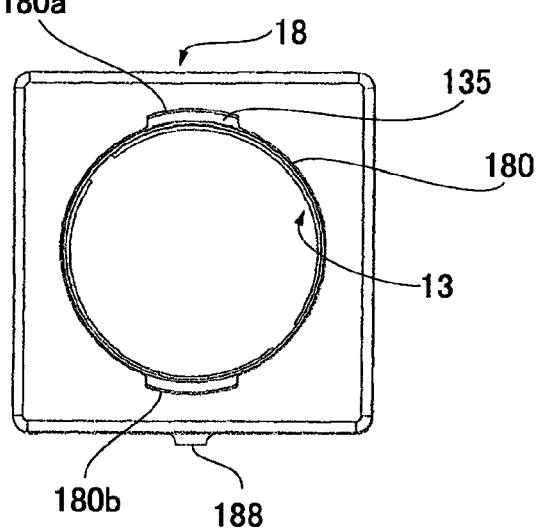
FIG. 9(c) is a plan view showing a positional relationship between a light transmission opening of a yoke and a sleeve.
Figure 10A:
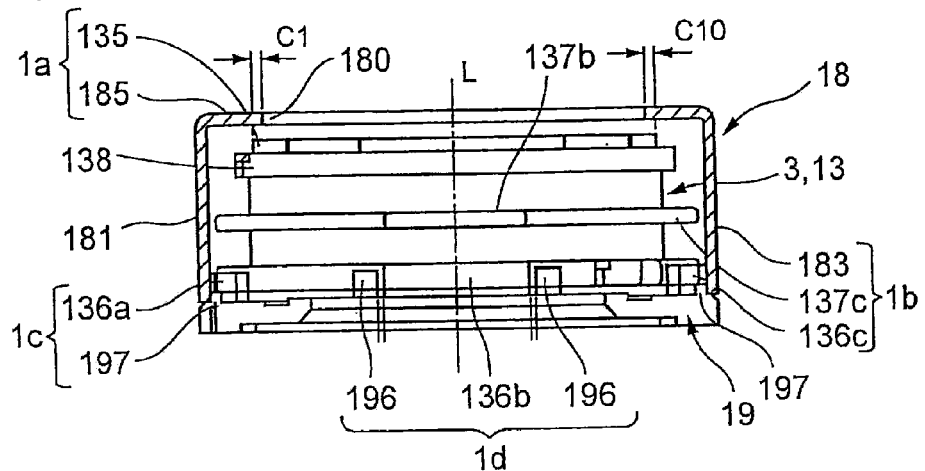
FIG. 10(a) is a longitudinal sectional view schematically showing a state where a movable body is located at a reference position in a lens drive device in accordance with an embodiment of the present invention.
Figure 10B:
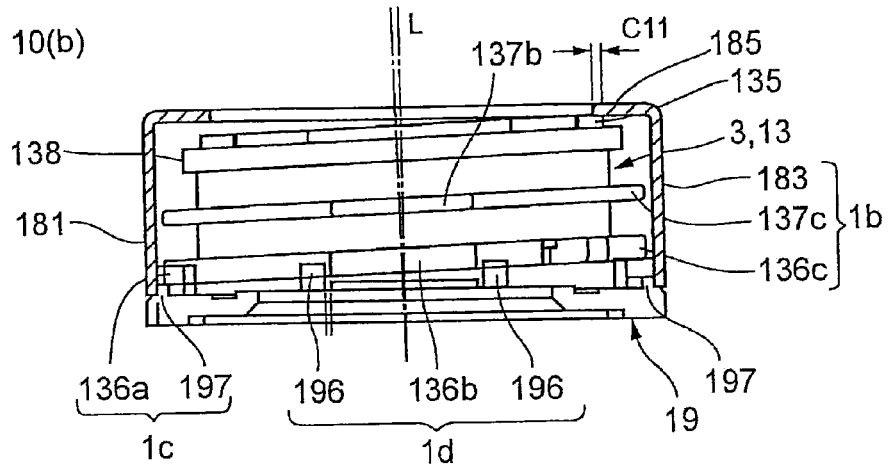
FIG. 10(b) is a longitudinal sectional view schematically showing a state where the movable body is shifted in a direction opposite to an inclined direction in a posture that the movable body has been inclined.
Figure 10C:
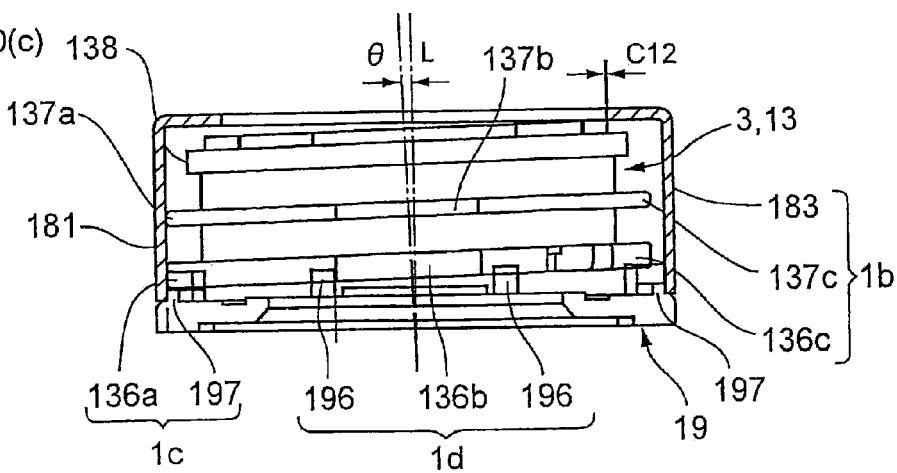
FIG. 10(c) is a longitudinal sectional view schematically showing a state where the movable body is shifted in the same direction as the inclined direction in a posture that the movable body has been inclined.

FIG. 9(a) is a plan view showing a yoke in the lens drive device 1 in accordance with an embodiment of the present invention, FIG. 9(b) is a plan view showing the sleeve 13 which is used in the movable body 3, and FIG. 9(c) is a plan view showing a positional relationship between the light transmission opening 180 of the yoke 18 and the sleeve 13. FIG. 10(a) is a longitudinal sectional view schematically showing a state where the movable body 3 is located at a reference position in the lens drive device 1 in accordance with an embodiment of the present invention, FIG. 10(b) is a longitudinal sectional view schematically showing a state where the movable body 3 is shifted in a direction opposite to an inclined direction in a posture that the movable body 3 has been inclined, and FIG. 10(c) is a longitudinal sectional view schematically showing a state where the movable body 3 is shifted in the same direction as the inclined direction in the posture that the movable body 3 has been inclined.

The lens drive device 1 in this embodiment uses the magnetic drive mechanism 5 for driving the movable body 3 and the fixed body 2 and the movable body 3 are connected with each other by using the first spring member 14x and the second spring member 14y. Therefore, when an external force such as impact is applied to the movable body 3 to cause it to shift in the optical axis direction "L" (thrust direction) or in the radial direction, the first spring member 14x and the second spring member 14y may be largely deformed to occur plastic deformation.

In order to prevent this problem, in this embodiment, as shown in FIG. 7(a) and FIG. 10(a), a stopper mechanism 1a in the thrust direction for restricting a moving range of the movable body 3 toward the object side is structured between the fixed body 2 and the movable body 3. In other words, in this embodiment, a cylindrical part 135 on the object side of the sleeve 13 (thrust movement preventing abutting part) is further more protruded on the object side than the second spring member 14y and, as shown in FIGS. 9(a), 9(b) and 9(c) and FIG. 10(a), an outer diameter dimension "D1" of the cylindrical part 135 is set to be sufficiently larger than an inner diameter "D2" of the light transmission opening 180, which is formed in the top plate part 185 of the yoke 18. Therefore, a sufficiently large over-lapping portion "C10" is formed between the top plate part 185 of the yoke 18 and the cylindrical part 135 of the sleeve 13. Accordingly, when the movable body 3 is shifted toward the object side due to an impact, the tip end part of the cylindrical part 135 of the sleeve 13 is abutted with a portion surrounding the light transmission opening 180 (thrust movement preventing abutted part) of the top plate part 185. Therefore, further more displacement in the thrust direction of the movable body 3 is prevented. In accordance with an embodiment of the present invention, the cylindrical part 135 is not required to be a complete cylindrical part in the circumferential direction and it may be provided with some cut-out parts in the circumferential direction.

Further, the moving range toward the imaging element side of the movable body 3 is restricted by a thrust direction stopper mechanism 1c which is structured of protruded parts 197 (thrust movement preventing abutted part) formed in the holder 19 and the protruded parts 136a, 136b, 136c and 136d (thrust movement preventing abutting part) of the movable body 3 (sleeve 13).

Further, as shown in FIG. 7(a) and FIG. 10(a), a radial direction stopper mechanism 1b is structured between the fixed body 2 and the movable body 3 for restricting a moving range in the radial direction of the movable body 3. In this embodiment, the radial direction stopper mechanism 1b is structured at two positions separated in the thrust direction from each other.

In order to structure the radial direction stopper mechanism 1b, in this embodiment, as shown in FIGS. 3(a) and 3(b), FIG. 7(a) and FIG. 10(a), abutting of the protruded parts 136a, 136b, 136c and 136d (radial movement preventing abutting part) and the protruded parts 137a, 137b, 137c and 137d (radial movement preventing abutting part), which are formed on the outer peripheral face of the sleeve 13, with the side plate parts 181, 182, 183 and 184 (radial movement preventing abutted part) of the yoke 18 is utilized. In other words, the protruded parts 136a, 136b, 136c and 136d and the protruded parts 137a, 137b, 137c and 137d are respectively located between the adjacent magnets 17 and face the side plate parts 181, 182, 183 and 184 (radial movement preventing abutted part) of the yoke 18 in the radial direction. Therefore, when the movable body 3 is displaced in the radial direction due to an impact, the protruded parts 136a, 136b, 136c and 136d and the protruded parts 137a, 137b, 137c and 137d of the sleeve 13 are abutted with the side plate parts 181, 182, 183 and 184 of the yoke 18. Accordingly, further displacement in the radial direction of the movable body 3 is prevented. In this radial direction stopper mechanism 1b, the side plate parts 181, 182, 183 and 184 of the yoke 18 are utilized as the radial movement preventing abutted part and thus the moving range in the radial direction of the movable body 3 can be restricted in the all range in the thrust direction of the movable body 3.

Further, the protruded parts 136a, 136b, 136c and 136d are located between the column-shaped protruded parts 196 of the holder 19 and the protruded parts 137a, 137b, 137c and 137d are respectively located between the adjacent magnets 17. Therefore, a radial direction stopper mechanism 1d is also structured by utilizing the protruded parts 136a, 136b, 136c and 136d, the protruded parts 137a, 137b, 137c and 137d, the magnets 17 and the column-shaped protruded parts 196. In other words, when the movable body 3 is going to turn around the optical axis due to an impact, the turning is prevented by means of that the protruded parts 136a, 136b, 136c and 136d and the protruded parts 137a, 137b, 137c and 137d are abutted with the side faces of the magnets 17 and/or the column-shaped protruded parts 196. In the radial direction stopper mechanism 1d, the magnets 17 and the column-shaped protruded parts 196 of the holder 19 having a sufficient dimension in the thrust direction are utilized as the radial movement preventing abutted part. Therefore, the moving range in the radial direction of the movable body 3 can be restricted in the all range in the thrust direction of the movable body 3.

In this embodiment, the protruded part 138 is formed at the object side end part of the sleeve 13 over the entire circumference on the outer peripheral face of the sleeve 13. However, a projecting dimension of the protruded part 138 is set to be smaller in comparison with other protruded parts 136a, 136b, 136c and 136d and the protruded parts 137a, 137b, 137c and 137d. Therefore, the protruded part 138 is not provided with a function restricting the moving range of the movable body 3 in the radial direction but is provided with only a function structuring the winding part of the second coil 32.

In this embodiment, the thrust direction stopper mechanisms 1a and 1c and the radial direction stopper mechanisms 1b and 1d are respectively structured to form over the entire circumference continuously or to form in plural portions in the circumferential direction. In other words, as shown in FIG. 1(a), the top plate part 185 of the yoke 18 is formed with the cut-out parts 180a and 180b at an outer circumferential edge of the light transmission opening 180. However, the light transmission opening 180 is formed in a substantially circular shape and the cylindrical part 135 of the sleeve 13 is also in a circular shape. Therefore, the thrust direction stopper mechanism 1a toward the object to be photographed side is continuously formed over the entire circumference. However, in accordance with an embodiment of the present invention, the thrust direction stopper mechanism 1a may be formed with some cut-out portions in the circumferential direction when the thrust direction stopper mechanism 1a is generally formed over the entire circumference.

Further, the radial direction stopper mechanism 1b, the thrust direction stopper mechanism 1c toward the imaging element side and the radial direction stopper mechanism 1d are respectively formed at four places in the circumferential direction.

Therefore, as shown in FIGS. 10(b) and 10(c), the moving range in the radial direction of the movable body 3 in an inclined posture to the optical axis is restricted over all directions by the thrust direction stopper mechanisms 1a and 1c and the radial direction stopper mechanisms 1b and 1d.

First, as shown in FIGS. 10(b) and 10(c), for example, the movable body 3 is assumed to have inclined toward the side plate part 181 of the yoke 18 due to an impact. When the inclination occurs, the cylindrical part 135 of the sleeve 13 is abutted with the top plate part 185 of the yoke 18, and the protruded part 136a of the sleeve 13 is abutted with the protruded part 197 formed in the holder 19. Therefore, further inclination of the movable body 3 is prevented.

Next, in the state where the movable body 3 has been inclined toward the side plate part 181, the movable body 3 is assumed to parallel-move toward the side plate part 183 of the yoke 18 on the opposite side to the side plate part 181 as shown in FIG. 10(b). When this displacement occurs, the protruded part 136c is abutted with the side plate part 183 in the radial direction stopper mechanism 1b arranged on the imaging element side and thus further displacement is prevented. Further, even when displacement in the radial direction occurs, the cylindrical part 135 of the sleeve 13 is abutted with the top plate part 185 of the yoke 18 through the overlapping C11, and the protruded part 136a of the sleeve 13 maintains the abutted state with the protruded part 197 that is formed in the holder 19. In this embodiment, in the state where the movable body 3 has been inclined toward the side plate part 181, when the movable body 3 is parallel-moved toward the side plate part 183 as shown in FIG. 10(b), this displacement may be restricted by the protruded part 136b and the column-shaped protruded part 196 which are structured as the radial direction stopper mechanism 1d.

On the contrary, in the state where the movable body 3 has been inclined toward the side plate part 181, the movable body 3 is assumed to parallel-move toward the side plate part 181 as shown in FIG. 10(c). When this displacement occurs, the protruded part 137a arranged on the imaging element side of the radial direction stopper mechanism 1b is abutted with the side plate part 181 and thus further displacement is prevented. Further, even when displacement in the radial direction occurs, the cylindrical part 135 of the sleeve 13 is abutted with the top plate part 185 of the yoke 18 through the overlapping C12, and the protruded part 136a of the sleeve 13 maintains the abutted state with the protruded part 197 that is formed in the holder 19. In this embodiment, in the state where the movable body 3 has been inclined toward the side plate part 181, when the movable body 3 is parallel-moved toward the side plate part 181 as shown in FIG. 10(c), this displacement may be restricted by the protruded part 136b and the column-shaped protruded part 196 which are structured as the radial direction stopper mechanism 1d.

As described above, in the lens drive device 1 in this embodiment, the thrust direction stopper mechanisms 1a and 1c and the radial direction stopper mechanisms 1b and 1d are respectively provided with a structure continuously formed over the entire circumference or a structure formed at plural positions in the circumferential direction. Therefore, even when the movable body 3 is shifted in any radial direction due to an impact from the outside with an obliquely inclined state of the movable body 3 in a certain direction, the first spring member 14x and the second spring member 14y are not deformed largely. Accordingly, the first spring member 14x and the second spring member 14y can be surely prevented from occurring plastic deformation. Further, even when the movable body 3 is shifted in the radial direction with an obliquely inclined state, the object side end part of the movable body 3 can be surely prevented from being caught by the light transmission opening 180 formed in the top plate part 185.

Further, the radial direction stopper mechanisms 1b and 1d function in all moving ranges in the thrust direction of the movable body 3. Therefore, even when the movable body 3 is shifted in the radial direction with a posture inclined to the optical axis at any position of the movable body 3 in the thrust direction, the moving range is restricted.

In addition, the radial movement preventing abutting part (protruded parts 136a, 136b, 136c and 136d and protruded parts 137a, 137b, 137c and 137d) of the radial direction stopper mechanisms 1b and 1d are formed of two sets which are separated from each other in the optical axis direction "L". Therefore, as described with reference to FIGS. 10(b) and 10(c), in a posture that the movable body 3 is inclined to one side with respect to the optical axis, even when the movable body 3 is radially shifted in the inclined direction or on the opposite side, its moving range can be restricted surely.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A lens drive device comprising:
   a fixed body;
   a movable body which includes a lens;
   a magnetic drive mechanism which includes a magnet disposed on the fixed body and a coil disposed on the movable body for magnetically driving the movable body in a lens optical axis direction;
   a spring member which connects the movable body with the fixed body;

a thrust direction stopper mechanism which includes a thrust movement preventing abutting part of the movable body and a thrust movement preventing abutted part of the fixed body between the movable body and the fixed body for restricting a moving range toward an object to be photographed side of the movable body by abutting of the thrust movement preventing abutting part with the thrust movement preventing abutted part; and a radial direction stopper mechanism which includes a radial movement preventing abutting part of the movable body and a radial movement preventing abutted part of the fixed body between the movable body and the fixed body for restricting a moving range in a radial direction of the movable body by abutting of the radial movement preventing abutting part with the radial movement preventing abutted part;

wherein the fixed body is provided with a top plate part for covering the movable body on the object to be photographed side and the top plate part is formed with a light transmission opening through which light is incident to the lens;

wherein the thrust direction stopper mechanism and the radial direction stopper mechanism are provided with one of a structure continuously formed along an entire circumference and a structure formed at plural places in a circumferential direction; and the moving range in the radial direction under an inclined posture of the movable body with respect to an optic axis is restricted over all directions by the radial direction stopper mechanism and the thrust direction stopper mechanism.

2. The lens drive device according to claim 1, wherein the radial movement preventing abutted part is provided with a dimension in which the radial movement preventing abutting part is capable of abutting with the radial movement preventing abutted part over all moving range in a thrust direction of the movable body.

3. The lens drive device according to claim 2, wherein
the fixed body includes a base which is disposed on an imaging element side end part;
the base is provided with four or more radial movement preventing abutted parts formed of a protruded part which is protruded toward the object to be photographed side in the circumferential direction; and
the radial movement preventing abutted part is provided with a protruding dimension in which the radial movement preventing abutting part is capable of abutting with the radial movement preventing abutted part over all the moving range in the thrust direction of the movable body.

4. The lens drive device according to claim 3, wherein
the thrust movement preventing abutting part is formed on an object side end face of the movable body in a circular or substantially circular shape having a larger diameter than the light transmission opening when viewed from the object side, and
the thrust movement preventing abutted part is formed of a portion surrounding the light transmission opening in the top plate part.

5. The lens drive device according to claim 4, wherein
the spring member is provided with a fixed body side connecting part which is held by the fixed body, a movable body side connecting part which is formed in a ring shape and connected with the movable body, and an arm part which connects the movable body side connecting part with the fixed body side connecting part, and
the thrust movement preventing abutting part is disposed at an object side position with respect to the spring member in a circular or substantially circular shape having a smaller outer diameter dimension than an inner diameter dimension of the movable body side connecting part of the spring member.

6. The lens drive device according to claim 5, wherein the radial movement preventing abutting part is formed at plural separated positions in the optical axis direction.

7. The lens drive device according to claim 6, wherein two radial movement preventing abutting parts which are adjacent to each other in the optical axis direction are protruded in the radial direction from the movable body to structure a winding part of the coil on an outer peripheral face of the movable body.

8. The lens drive device according to claim 1, wherein
the thrust movement preventing abutting part is provided on an object side end face of the movable body in a circular or substantially circular shape having a larger diameter than the light transmission opening when viewed from the object side, and
the thrust movement preventing abutted part is formed of a portion surrounding the light transmission opening in the top plate part.

9. The lens drive device according to claim 8, wherein
the spring member is provided with a fixed body side connecting part which is held by the fixed body, a movable body side connecting part which is formed in a ring shape and connected with the movable body, and an arm part which connects the movable body side connecting part with the fixed body side connecting part, and
the thrust movement preventing abutting part is disposed at an object side position with respect to the spring member in a circular or substantially circular shape having a smaller outer diameter dimension than an inner diameter dimension of the movable body side connecting part of the spring member.

10. The lens drive device according to claim 1, wherein the radial movement preventing abutting part is formed at plural separated positions in the optical axis direction.

11. The lens drive device according to claim 10, wherein two radial movement preventing abutting parts which are adjacent to each other in the optical axis direction are protruded in the radial direction from the movable body to structure a winding part of the coil on an outer peripheral face of the movable body.

12. The lens drive device according to claim 1, wherein the fixed body includes a base which is disposed on an imaging element side end part and a yoke which is fitted on the object side of the base, and the radial movement preventing abutted part is formed by the yoke.

13. The lens drive device according to claim 1, wherein
the fixed body includes a base which is disposed on an imaging element side end part and a yoke which is fitted on the object to be photographed side of the base,
the movable body includes a sleeve formed in a cylindrical shape,
the coil of the magnetic drive mechanism is wound around an outer peripheral face of the sleeve,
the magnet is comprised of four magnets which face the outer peripheral face of the coil,
the yoke is formed in a substantially rectangular parallelepiped shape and provided with the top plate part and side plate parts,
the four magnets are fixed to four corner portions of an inner peripheral face of the side plate parts of the yoke in a separated state in a circumferential direction, and the radial movement preventing abutting part is a protruded part which is protruded in a radial direction from the outer peripheral face of the sleeve to structure a winding part of the coil.

14. The lens drive device according to claim 13, wherein the coil is comprised of a first coil and a second coil which are dividedly wound around in an optical axis direction, and a plurality of radial movement preventing abutting parts is structured at separated positions in the optical axis direction by means of that the protruded parts are formed to structure winding parts of the first coil and the second coil.

15. The lens drive device according to claim 13, wherein the protruded part which structures the winding part of the coil is located between the magnets fixed to the four corner portions of the yoke in the separated state in the circumferential direction and, when the sleeve is displaced in the radial direction, displacement in the radial direction of the sleeve is restricted by abutting of the protruded part structuring the winding part of the coil with the side plate part of the yoke.

16. The lens drive device according to claim 15, wherein the thrust movement preventing abutting part is provided on an object side end face of the sleeve in a circular or substantially circular shape having a larger diameter than the light transmission opening when viewed from the object side, and the thrust movement preventing abutted part is formed of a portion surrounding the light transmission opening in the top plate part.

17. The lens drive device according to claim 16, wherein an outer peripheral face of an end part on an imaging element side of the sleeve is formed with a protruded part structuring the winding part of the coil so as to face the side plate parts of the yoke, the base is provided with the radial movement preventing abutted parts formed of a protruded part which is protruded toward the object to be photographed side so as to be capable of abutting with the protruded part structuring the winding part of the coil in the circumferential direction; and the radial movement preventing abutted part is provided with a protruding dimension in which the radial movement preventing abutting part is capable of abutting with the radial movement preventing abutted part over all the moving range in the thrust direction of the sleeve.

* * * * *